United States Patent [19]
Leone

[11] Patent Number: 5,893,440
[45] Date of Patent: Apr. 13, 1999

[54] FLEXIBLE MOUNTING FOR A CLUTCH

[75] Inventor: Michael F. Leone, Sewell, N.J.

[73] Assignee: Dana Corporation, Toledo, Ohio

[21] Appl. No.: 08/874,876

[22] Filed: Jun. 13, 1997

[51] Int. Cl.[6] .................. F16D 13/58; F16D 27/105; F16D 27/14

[52] U.S. Cl. .................. 192/26; 192/84.81; 192/110 B; 192/115; 403/119

[58] Field of Search .................. 192/26, 84.81, 192/110 B, 115; 403/119, 164, 165

[56] References Cited

U.S. PATENT DOCUMENTS

| | | |
|---|---|---|
| 2,328,518 | 8/1943 | Wahlberg et al. . |
| 2,973,851 | 3/1961 | Rudisch .................. 192/110 B X |
| 3,181,669 | 5/1965 | Kunde et al. . |
| 3,381,784 | 5/1968 | Miller et al. .................. 192/110 B X |
| 3,393,779 | 7/1968 | Sacchini .................. 192/26 |
| 4,464,953 | 8/1984 | Tar . |
| 4,502,578 | 3/1985 | Koyama .................. 192/26 |
| 4,570,768 | 2/1986 | Nishimura et al. . |
| 4,601,374 | 7/1986 | Ladin . |
| 4,620,625 | 11/1986 | Ladin . |
| 4,630,722 | 12/1986 | Figueira et al. .................. 192/84.81 |
| 4,760,903 | 8/1988 | Stegelmeier et al. .................. 192/26 |
| 4,949,827 | 8/1990 | Leigh-Monstevens et al. . |
| 5,205,387 | 4/1993 | Checa . |
| 5,251,735 | 10/1993 | Lamoureux .................. 192/84.81 |
| 5,335,760 | 8/1994 | Leone .................. 192/26 |
| 5,609,233 | 3/1997 | Villata . |
| 5,730,268 | 3/1998 | Villata . |

FOREIGN PATENT DOCUMENTS 057354  8/1982  European Pat. Off. .

*Primary Examiner*—Richard M. Lorence
*Attorney, Agent, or Firm*—MacMillan, Sobanski & Todd, LLC

[57] ABSTRACT

A mounting system for attaching a clutch assembly to a base structure includes a support member, a clutch assembly mounted on the support member, the clutch assembly having a clutch with an axis generally normal to the support member, a bearing assembly mounted on the support member, and a fastener attached to the base structure and extending through the bearing assembly to prevent rotation of the support member with respect to the axis of the clutch, where the bearing assembly enables relative movement of the support member away from the plane of the base structure.

9 Claims, 2 Drawing Sheets

FLEXIBLE MOUNTING FOR A CLUTCH

TECHNICAL FIELD

This invention relates to clutches for selectively connecting a rotational device to a source of rotational power. More particularly, this invention relates to structures for mounting clutches in a manner to improve the operation of the apparatus and the service life of the mounting structure.

BACKGROUND OF THE INVENTION

Clutches are well known devices that are frequently employed in machinery to connect rotatively driven mechanisms to a source of rotational power. Typically, a clutch includes an input shaft, an output shaft and some mechanism to selectively couple the input shaft to the output shaft. When the clutch is engaged, the input shaft is connected to the output shaft to rotatably drive the driven mechanism. When the clutch is disengaged the input shaft is disconnected from the output shaft. There are other different types of clutches, including friction clutches.

One well known type of clutch is a wrap spring clutch. The primary parts of a wrap spring clutch include an input hub or shaft, an output hub or shaft, and a coiled drive spring for selectively causing the input hub to rotatably drive the output hub. Wrap spring clutches are used for a variety of applications, including riveting machines, copiers, stitching machines and conveyors. The purpose of selectively driving the output hub is accomplished by providing the input hub and the output hub with adjacent, axially aligned cylindrical surfaces. Portions of the drive spring are disposed about each of these cylindrical surfaces. The drive spring has a relaxed inner diameter which is slightly smaller than the outer diameter of the cylindrical surfaces of the input and output hubs. Thus, as is well known in the art, when the input hub is rotated in a first direction, the drive spring is wrapped tightly about the co-axially oriented cylindrical surfaces. As a result, the output hub is driven to rotate in the first direction with the input hub. When the input hub is rotated in a second direction, however, the drive spring is expanded about the co-axially oriented cylindrical surfaces. As a result, the output hub is not driven to rotate in the second direction with the input hub.

A frequent arrangement involving clutches, particularly wrap spring clutches, includes a solenoid arm to control the engagement and disengagement of the clutch. Control tangs at the end of the drive spring facilitate the expansion and contraction of the drive spring. The control tangs are fixed within a hollow cylindrical control collar disposed about the drive spring. The external surface of the control collar is fitted with several stops that are selectively engaged by the solenoid arm. When the control collar is engaged by the solenoid arm, the control tang is moved such that the drive spring expands about the input and output hubs, resulting in disengagement of the wrap spring clutch. When the collar is not engaged by the solenoid arm, the drive spring contracts about the input and output hubs, resulting in engagement of the clutch, and co-rotation of the input and output hubs.

A solenoid coil is typically used to operate the solenoid arm. As is well known, a solenoid coil includes an armature that is axially movable in response to the passing of an electric current passing through an electromagnetic coil. As a result, the solenoid arm can be selectively moved into and out of engagement with the control collar to control the operation of the clutch. The clutch, the solenoid arm and the solenoid coil are referred to collectively as a clutch assembly.

In a common mounting design for a clutch assembly, the clutch, the solenoid coil and the solenoid arm are all mounted on a clutch plate or other support member so that these components can be fixed relative to each other. The clutch plate can then be mounted on any desired base structure or support surface, such as a structural support or structural frame member associated with the machine in which the clutch is housed. A wrap spring clutch can include a brake hub extending along the axial centerline of the clutch. Mounted for rotation on the brake hub are the input hub and the output hub. The brake hub is rigidly attached to the clutch plate by any means, such as by bolting.

Operation of the clutch results in torque forces between the clutch and the clutch plate. The clutch plate must therefore be locked or tied to a nonrotatable element so that it doesn't rotate along with the clutch. It would seem that a simple solution to prevent unwanted rotation of the clutch plate would be to bolt or otherwise rigidly mount the clutch plate to a support surface, such as a structural support or structural frame member associated with the machine in which the clutch is housed. However, rigidly attaching the clutch plate to a relatively immovable surface leads to other problems. During operation of the clutch, the torque forces between the clutch and the clutch plate cause the clutch plate to be twisted or flexed relative to the clutch plate. If the clutch plate is rigidly tied or fixed to an immovable surface, the plate hub and the output hub faces will bind, causing premature wear and excessive heat generation.

This problem of binding has been solved in the past by mounting the clutch plate in an arrangement that allows the clutch plate to move relatively freely in different planar angles with respect to the support surface as needed to accommodate the torque forces of the clutch without binding. The angular movement is through a relatively small angular range, usually no greater than about 10 degrees. Even though angular movement of the clutch plate is permitted, the clutch plate must still be prevented from rotating in a direction around the longitudinal axis of the clutch.

To prevent rotation of the clutch plate vis-a-vis an immovable support surface, an antirotation hole or slot is incorporated in the clutch plate to allow a connection with a relatively fixed surface. Shoulder bolts, dowel pins or other types of bolts are passed through the antirotation slot and are rigidly connected to an immovable support surface to prevent rotation of the clutch plate. The antirotation slot is an orifice having greater dimensions than the diameter of the bolt rigidly connected to the support surface. The clutch plate is prevented from rotating by the contact between the bolt and the slot, but clutch plate can still move angularly to accommodate the torque forces between the clutch and clutch plate. As an alternative to the antirotation slot, antirotation connections to the edge of the clutch plate can also be used.

The use of an antirotation slot in the clutch plate is not without its problems, however. The repeated action of the loosely fitting bolt eventually wears or elongates the slot. This elongation affects the output stop position and causes the plate to bounce. This bouncing can result in "double cycling" of the clutch, where the stop cam bounces over the actuator causing the clutch to continue driving through to the next stop. If this condition becomes excessive, the stop cam will continue to ratchet over the actuator and the clutch will drive continuously. The increased play generated at the antirotation position on the plate can also cause the solenoid plunger to bounce, thereby causing the unit to prematurely fail. Further, as the play at the antirotation slot increases, the metal-to-metal noise grows to an undesirable level.

In the past, designs employing resilient materials around the pins or bolts have been used in an attempt to reduce the wear and noise associated with these clutches. While using resilient materials provides temporary benefits in reduced wear and diminished noise, the resilient material soon wears out and requires replacement, and therefore this is not a satisfactory solution.

It would be advantageous if a new mechanism could be developed to prevent the clutch plate from rotating, particularly where the mechanism allowed the clutch plate to undergo a minimal amount of angular play vis-a-vis the support surface to accommodate the forces between the clutch and the clutch plate. Such an improved mechanism would eliminate the double clutch cycling condition and the excessive noise associated with currently used antirotation slots having too much play.

SUMMARY OF THE INVENTION

The above objects as well as other objects not specifically enumerated are achieved by a mounting system for attaching a clutch assembly to a base structure, the mounting system including a support member, a clutch assembly mounted on the support member, the clutch assembly having a clutch with an axis generally normal to the support member, a bearing assembly mounted on the support member; and a fastener attached to the base structure and extending through the bearing assembly to prevent rotation of the support member with respect to the axis of the clutch, where the bearing assembly enables relative movement of the support member away from the plane of the base structure.

In a preferred embodiment of the invention, the bearing assembly is a spherical bearing. In another preferred embodiment, the support member can be moved at an angle within the range of from about 0 to about 8 degrees from the plane of the support structure.

DETAILED DESCRIPTION AND PREFERRED EMBODIMENTS OF THE INVENTION

Figure 1:
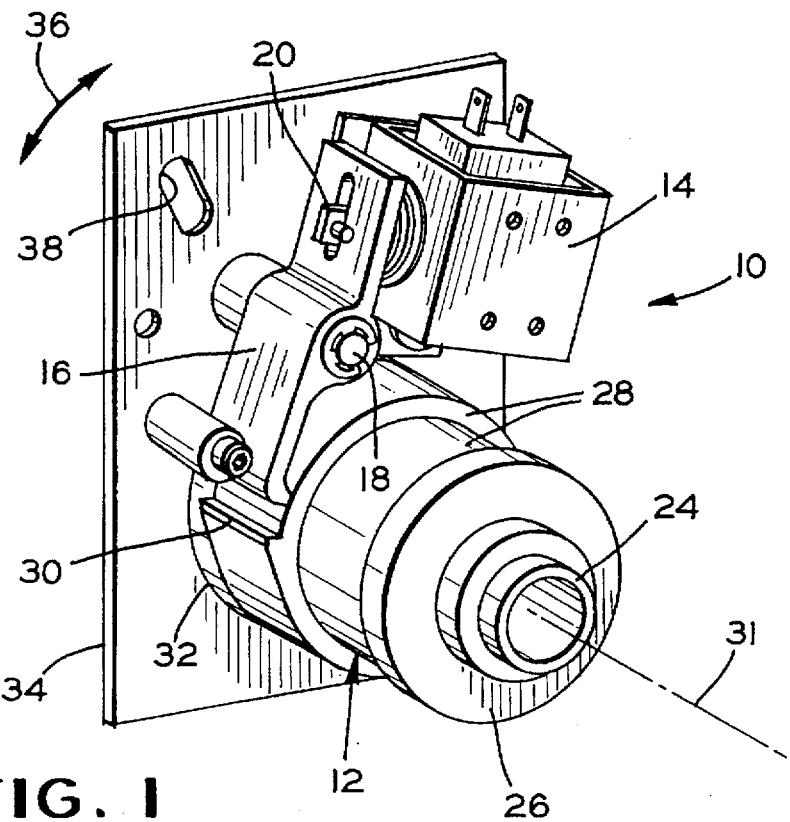
FIG. 1 is a schematic perspective view of a prior art clutch assembly and clutch plate having an antirotation slot.

As shown in FIG. 1, the clutch assembly, indicated generally at 10, includes a clutch 12, solenoid coil 14 and solenoid arm 16. The solenoid arm 16 is mounted for rotation or a pivoting motion about pivot pin 18. The solenoid coil has a plunger 20 which, when activated, moves or rotates the solenoid arm 16 into or out of engagement with the clutch 12. The clutch illustrated is a wrap spring clutch having an output hub 24, an input hub 26 and a control collar 28. The input hub 26 is typically attached to a pulley or sprocket, not shown. The clutch also includes a helical drive spring, not shown, which is wrapped about coaxial surfaces of the output hub 24 and input hub 26. The control collar 28 has one or more steps 30 which can be engaged by the solenoid arm 16 to prevent the rotation of the control collar relative to the solenoid arm. Also included in the clutch 12 is a brake hub or plate hub 32 mounted coaxially with the control collar 28, the input hub 26 and the output hub 24, all generally coaxial along clutch axis 31. The plate hub 32 is rigidly attached to a clutch plate to connect the clutch 12 to the clutch plate 34. When the clutch is engaged (i.e., the solenoid arm 16 is contacting the step 30 on the control collar 28), the output hub 24 is driven by the rotation of the input hub 26. The construction of wrap spring clutches as described above is well known to those skilled in the art, as exemplified by U.S. Pat. No. 5,335,760 to Leone, which is hereby incorporated by reference.

The clutch assembly 10, including the clutch 12, solenoid coil 14 and solenoid arm 16, is mounted on the clutch plate 34, which can be any type of support member suitable for supporting the components of the clutch assembly 10. It is to be understood that the various parts of the clutch assembly can be positioned anywhere on the clutch plate 34. The clutch plate 34 has a tendency to rotate about the axis 31 of the clutch 12 during operation of the clutch 12, as indicated by arrow 36. To prevent such rotation, an antirotation slot or aperture 38 is provided in the clutch plate 34. A bolt or pin, not shown in FIG. 1, is inserted through the aperture 38, and is rigidly connected to a relatively immovable base structure, not shown in FIG. 1. The purpose of the bolt is to prevent the rotation of the clutch plate 34, with respect to a fixed or relatively immovable object, or with respect to the axis 31 of the clutch. The diameter of bolt is purposely sized smaller than the width of the antirotation slot 38 to give the clutch plate 34 freedom or "play" to move angularly with respect to the base structure. As is known by those skilled in the art, some play in the mounting of the clutch plate 34 is necessary to prevent binding.

Figure 2:
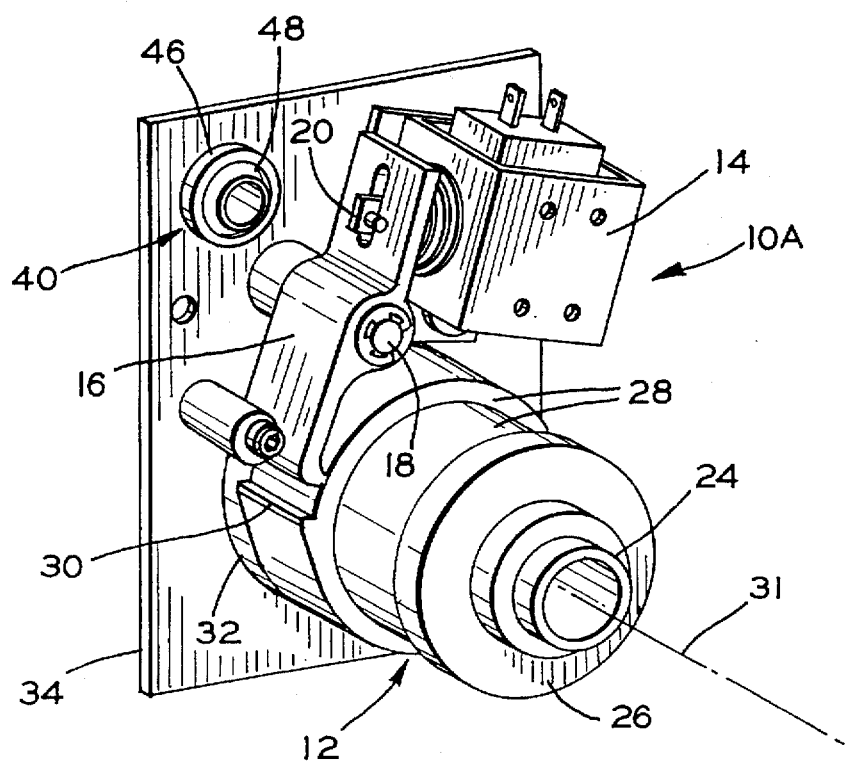
FIG. 2 is a schematic perspective view of the clutch assembly and clutch plate of invention.
Figure 3:
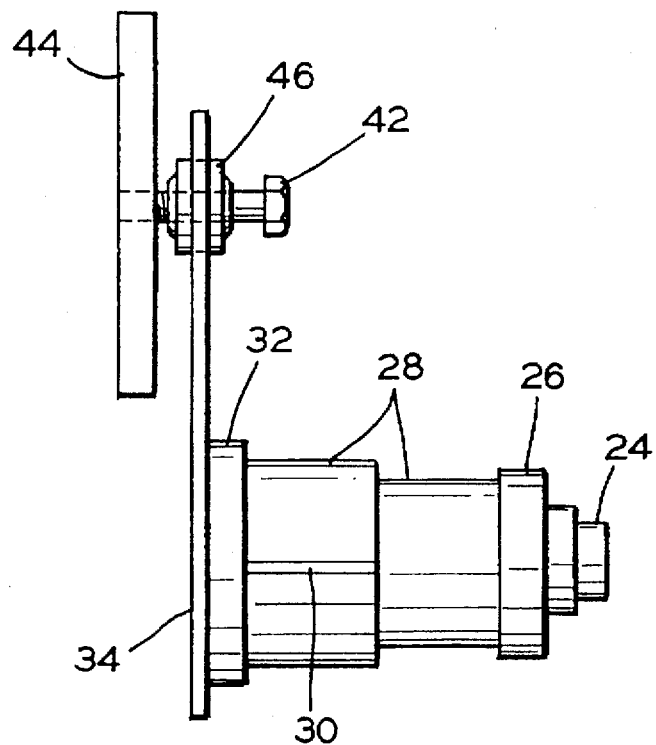
FIG. 3 is a schematic end view of the mounting system of the invention illustrating the mounting of the clutch assembly and clutch plate of FIG. 2 onto a base structure.

As shown in FIGS. 2 and 3, the clutch assembly 10A of the invention differs from prior art clutch assemblies in that a spherical bearing 40 is included to provide an anti-rotation connection between the bolt 42 and the relatively immovable base structure 44. The spherical bearing 40 is comprised of an outer race 46 having an inner race 48 mounted inside. The outer race 46 is fitted into an aperture, not shown, in the clutch plate, and preferably the outer race has a circumferential retainer slot, not shown, on its outer surface to enable the spherical bearing 40 to be press fit into the clutch plate aperture. The outer surface of the inner race 48 and the inner surface of the outer race 46 both have a generally spherical curvature, and are both quite smooth, thereby enabling the inner race 48 to freely rotate in any direction with respect to the outer race 46. This free rotation allows the bolt extending through the spherical bearing to assume different angles with respect to the axis of the outer race 46. The spherical bearing can be mounted anywhere on the clutch plate 34.

Figure 4:
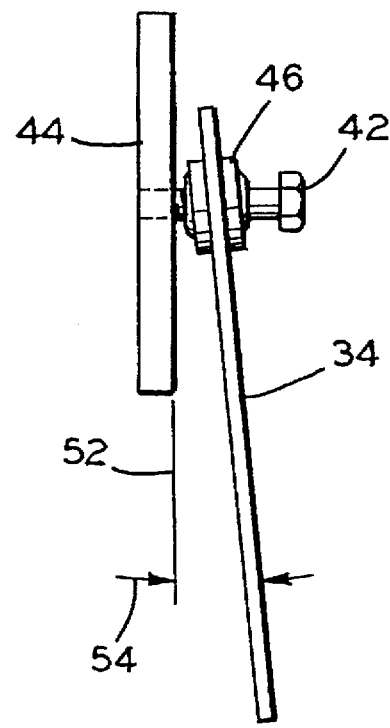
FIG. 4 is a schematic end view similar to FIG. 3, illustrating the angular movement of the clutch plate with respect to the plane of the base structure.
Figure 5:
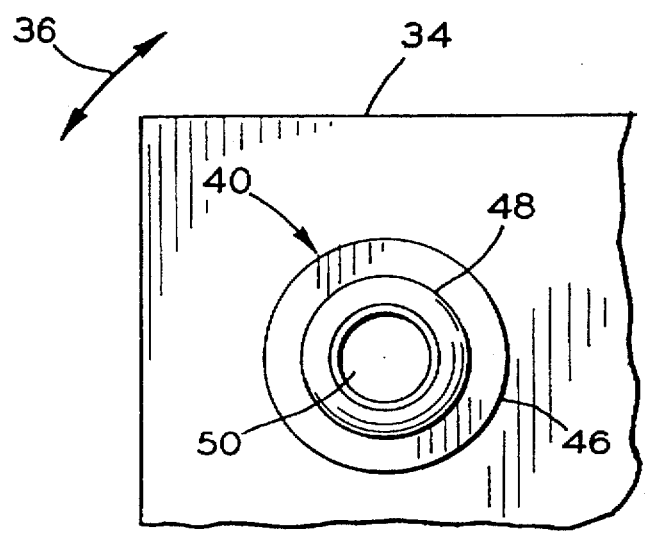
FIG. 5 is a schematic cross-sectional view of the bearing assembly and a section of the clutch plate.

As shown in FIG. 5, the inner race 48 of the spherical bearing 40 has a bore 50 through which the bolt 42 is inserted. When the bolt 42 is inserted thorough the bore 50 and rigidly attached to the base structure 44, the clutch plate 34 is prevented from rotating in the direction of the arrows 36, i.e., about the axis 31 which is generally normal to the support member. However, as shown in FIG. 4, the clutch plate 34 is free to rotate or angle outwardly with respect to the plane 52 of the support surface 44. This enables the clutch to operate without binding. The angle 54 through which the clutch plate can rotate with respect to the plane 52 is typically an angle within the range of from about 0 to about 8 degrees from the plane of the support structure 44.

In operation, the solenoid 14 is activated to rotate the solenoid arm to engage the steps 30 in the control collar 28.

This links the output hub 24 for rotation with the input hub 26. The bolt 42 rigidly attached to the relatively immovable support surface 44 is inserted through the spherical bearing 40 so that the clutch plate 34 is prevented from rotating with respect to the axis 31 of the clutch. The freedom of movement of the inner race 48 of the spherical bearing 40 with respect to the outer race 46 allows the clutch plate to be rotated or angled out away from the plane 52 of the support surface 44, thereby enabling the clutch 12 to operate without binding.

The principle and mode of operation of this invention have been described in its preferred embodiment. However, it should be noted that this invention may be practiced otherwise than as specifically illustrated and described without departing from its scope.

What is claimed is:

1. A clutch assembly comprising:

a support member having a clutch mounted thereon;

a spherical bearing having a first race supported on said support member and a second race movably supported on said first race; and a base structure defining a plane and having a portion that cooperates with said second race of said bearing for supporting said support member and said clutch on said base structure to enable relative movement of said support member away from said plane of said base structure.

2. The clutch assembly defined in claim 1 wherein said first race of said spherical bearing is an outer race and said second race of said spherical bearing is an inner race.

3. The clutch assembly defined in claim 1 wherein said first race of said spherical bearing has an outer surface that is press fit within an aperture formed through said support member.

4. The clutch assembly defined in claim 1 wherein said portion of said base structure extends outwardly from said base structure into cooperation with said second race of said spherical bearing.

5. The clutch assembly defined in claim 1 wherein said portion of said base structure is a bolt that is connected to said base structure and cooperates with said second race of said spherical bearing.

6. The clutch assembly defined in claim 1 wherein said portion of said base structure extends through said second race of said spherical bearing.

7. The clutch assembly defined in claim 1 wherein said clutch assembly includes a clutch, a solenoid coil, and an arm that is selectively moved by said solenoid coil to operate said clutch.

8. The clutch assembly defined in claim 1 wherein said clutch is a wrap spring clutch having a plate hub rigidly mounted on said support member, an output hub, and an input hub.

9. The clutch assembly defined in claim 1 wherein said support member can be moved at an angle in the range of from about zero degrees to about eight degrees from said plane of said base structure.

* * * * *

UNITED STATES PATENT AND TRADEMARK OFFICE
CERTIFICATE OF CORRECTION

PATENT NO. : 5,893,440
DATED : April 13, 1999
INVENTOR(S) : Michael F. Leone

It is certified that error appears in the above-identified patent and that said Letters Patent is hereby corrected as shown below:

Column 6, Claim 8, line 1, delete "1" and insert -- 7 --.

Signed and Sealed this

Twenty-seventh Day of July, 1999

Attest:

Q. TODD DICKINSON

*Attesting Officer*  *Acting Commissioner of Patents and Trademarks*